United States Patent [19]
Komiyama

[11] Patent Number: 6,011,553
[45] Date of Patent: Jan. 4, 2000

[54] DATA TRANSFER DISPLAYING/OPERATING METHOD

[75] Inventor: Kenji Komiyama, Omiya, Japan

[73] Assignee: Sharp Kabushiki Kaisha, Osaka, Japan

[21] Appl. No.: 08/964,650

[22] Filed: Nov. 5, 1997

[30] Foreign Application Priority Data

Nov. 6, 1996 [JP] Japan .................................. 8-293892

[51] Int. Cl.⁷ .................................................. G06F 3/14
[52] U.S. Cl. ..................... 345/349; 345/348; 345/334; 345/335; 395/701
[58] Field of Search ..................... 345/348, 349, 345/339, 335, 970, 977, 334; 395/701

[56] References Cited

U.S. PATENT DOCUMENTS

| 5,386,568 | 1/1995 | Wold et al. ............................. 395/700 |
| 5,710,897 | 1/1998 | Schneider ............................... 395/334 |
| 5,745,715 | 4/1998 | Pickover et al. ....................... 345/348 |
| 5,815,080 | 9/1998 | Taguchi .................................. 345/348 |

FOREIGN PATENT DOCUMENTS

| 2605370 | 2/1990 | Japan . |
| 2560191 | 9/1994 | Japan . |
| 2511647B2 | 4/1996 | Japan . |

*Primary Examiner*—Raymond J. Bayerl
*Assistant Examiner*—David E. Brown

[57] ABSTRACT

When a pointer is clicked on a connector (subicon) graphically attached to a source object (text file icon) to be transferred, the connector moves together with the pointer. The source object and the connector are connected with a connection line. When the source object is connected to a socket of a destination object, and all preparations for transfer are made, data is transferred.

21 Claims, 15 Drawing Sheets

FIG. 9

| | INPUT / OUTPUT | EDIT OBJECT | | FILE ICON | | EDIT WINDOW | | DEVICE ICON | |
|---|---|---|---|---|---|---|---|---|---|
| | | TEXT OBJECT | GRAPHIC OBJECT | TEXT FILE ICON | VIDEO CLIP ICON | FILE WINDOW | TEXT EDITOR WINDOW | GRAPHIC PRINTER ICON | CHARACTER PRINTER ICON |
| EDIT OBJECT | TEXT OBJECT | O | X | O | X | O | O | O | O |
| | GRAPHIC OBJECT | X | O | X | O | X | O | O | X |
| FILE ICON | TEXT FILE ICON | O | O | O | X | O | O | O | O |
| | VIDEO CLIP ICON | X | O | X | O | O | X | O | X |
| EDIT WINDOW | FILE WINDOW | O | O | O | O | O | O | O | O |
| | TEXT EDITOR WINDOW | O | O | O | X | O | O | O | O |
| DEVICE ICON | IMAGE SCANNER | X | O | X | X | O | X | O | X |

DATA TRANSFER DISPLAYING/OPERATING METHOD

BACKGROUND OF THE INVENTION (1) Field of the Invention

The present invention relates a data transfer displaying/operating method which allows a user to easily transfer data using an image display in a computer system having a graphical user interface. The user instructs image representations on a screen of the display by using a pointing device such as a mouse to perform a computer operation.

(2) Description of the Prior Art

Conventionally, in a GUI (Graphical User Interface) environment represented by an operating system such as Mac OS of Apple Computer or MS-Windows (trademark of Microsoft) of Microsoft Corporation, a computer can be operated simply by using a pointing device such as a mouse.

In these operating systems under the GUI environment, an icon operated with the pointing device on the screen is called a pointer icon or pointer. An operation of placing this pointer on an object on the screen is called "point". An operation of pointing an object on the screen with the pointer and depressing a button of the pointing device is called "click". An operation of moving the pointer while maintaining the button depressed is called "drag". An operation of moving the object while dragging it and placing the object on another object is called "drop".

In these systems, data transfer between objects is performed via a scrap buffer, and after transfer the data is temporarily stored in a file. An operation of printing data or storing data in a file is generally selected from a pull-down menu prepared in an application program. A file icon is sometimes dropped to directly transfer the file contents. When an edit object such as text or graphic data is to be transferred, the transfer area is first dragged with the mouse. Next, a menu item such as "cut" or "copy" is selected from the pull-down menu to store the data in a scrap buffer. Finally, a menu item "paste" is selected on the transfer destination.

However, since a number of operations are available for data transfer, as described above, the user must selectively use an operation according to the attribute of the object to be processed or the transfer purpose. In addition, a relay operation of temporarily storing data in the scrap buffer or file is required before data transfer, and the user must understand this relay operation first. As for drop, the place where drop is enabled, or the type of data which can be dropped cannot be known in the drop operation.

SUMMARY OF THE INVENTION

The present invention has been made to solve the above problems, and has as its object to provide a data transfer displaying/operating method which reduces the number of operation steps needed and intuitively performs a data transfer operation.

In order to achieve the above object, according to the first aspect of the present invention, there is provided a data transfer displaying/operating method for a computer system having a graphical user interface on which a user instructs an image representation on a screen using a pointing device to perform a computer operation, comprising the steps of displaying a pair of subicons having connector shapes or projecting and recessed shapes together with icons representing a transmission source and transmission destination of data transfer, instructing connection between the transmission source and transmission destination of data transfer using a pointing icon on the screen controlled by the pointing device, and transferring data from the transmission source to the transmission destination which are instructed to be connected.

According to the second aspect of the present invention, in the data transfer displaying/operating method of the first aspect, the step of instructing connection between the transmission source and transmission destination of data transfer includes moving the subicon having the connector shape or the projecting or recessed shape together with the pointing icon.

According to the third aspect of the present invention, in the data transfer displaying/operating method of the first aspect, the step of instructing connection between the transmission source and transmission destination of data transfer includes changing the pointing icon on the screen to a shape of a hand picking up the subicon.

According to the fourth aspect of the present invention, in the data transfer displaying/operating method of the first aspect, connection between the transmission source and transmission destination of data transfer is instructed by drawing a connection line from the transmission source to the transmission destination using the pointing icon.

According to the fifth aspect of the present invention, in the data transfer displaying/operating method of the fourth aspect, stop of data transfer from the transmission source to the transmission destination is instructed by cutting the connection line using a pointing icon having a shape of scissors.

According to the sixth aspect of the present invention, in the data transfer displaying/operating method of the first aspect, whether data transfer from the transmission source to the transmission destination is enabled is determined on the basis of a data type correlation table stored in a memory.

According to the seventh aspect of the present invention, in the data transfer displaying/operating method of the sixth aspect, subicons having plug and socket shapes or projecting and recessed shapes which are fitted each other are displayed together with the icons representing the transmission source and transmission destination for which it is determined on the basis of the data type correlation table that data transfer is enabled.

According to the eighth aspect of the present invention, in the data transfer displaying/operating method of the sixth aspect, only icons representing the transmission source and transmission destination for which it is determined on the basis of this data type correlation table that data transfer is enabled have subicons having connector shapes or projecting and recessed shapes.

According to the ninth aspect of the present invention, in the data transfer displaying/operating method of the first aspect, subicons representing data transfer functions are displayed together with the icons representing the transmission source and transmission destination.

In the data transfer displaying/operating method according to the first aspect of the present invention, subicons having connector shapes or projecting and recessed shapes are added to icons representing a transmission source and transmission destination of data transfer, and connection is instructed using a pointing icon. With this arrangement, the data transfer operation can be intuitively performed.

In the data transfer displaying/operating method according to the second aspect of the present invention, the subicons having connector shapes or projecting and recessed shapes move together with the pointing icon. With this arrangement, a data transfer connection instruction can be visually recognized.

In the data transfer displaying/operating method according to the third aspect of the present invention, when connection is to be instructed, the pointing icon changes to the shape of a hand picking up the subicon. Therefore, this system can be intuitively understood by the user.

In the data transfer displaying/operating method according to the fourth aspect of the present invention, connection is instructed by drawing a connection line from the transmission source to the transmission destination. Therefore, this system can be intuitively understood by the user.

In the data transfer displaying/operating method according to the fifth aspect of the present invention, stop of data transfer is instructed by cutting the connection line using a pointing icon having a shape of scissors. Therefore, this system can be intuitively understood by the user.

In the data transfer displaying/operating method according to the sixth aspect of the present invention, whether data transfer is enabled is determined on the basis of a data type correlation table. Therefore, whether data transfer from the transmission source to the transmission destination is enabled can be easily determined in a short time.

In the data transfer displaying/operating method according to the seventh aspect of the present invention, subicons having plug and socket shapes or projecting and recessed shapes are added to the icons representing the transmission source and transmission destination for which data transfer is enabled. Therefore, the combination of the transmission source and the transmission destination for which data transfer is enabled can be visually recognized with ease.

In the data transfer displaying/operating method according to the eighth aspect of the present invention, only icons of the transmission source and transmission destination for which data transfer is enabled have subicons having connector shapes or projecting and recessed shapes. Therefore, the combination of the transmission source and the transmission destination for which data transfer is enabled can be easily recognized in a short time.

In the data transfer displaying/operating method according to the ninth aspect of the present invention, subicons representing data transfer functions are displayed together with the icons of the transmission source and transmission destination. With this arrangement, a function can be selected without using any pull-down menu.

BRIEF DESCRIPTION OF THE DRAWINGS

FIG. 9 is a view showing a data type correlation table;

DESCRIPTION OF THE PREFERRED EMBODIMENTS

The embodiments of the present invention will be described below in detail with reference to the accompanying drawings.

Figure 1:
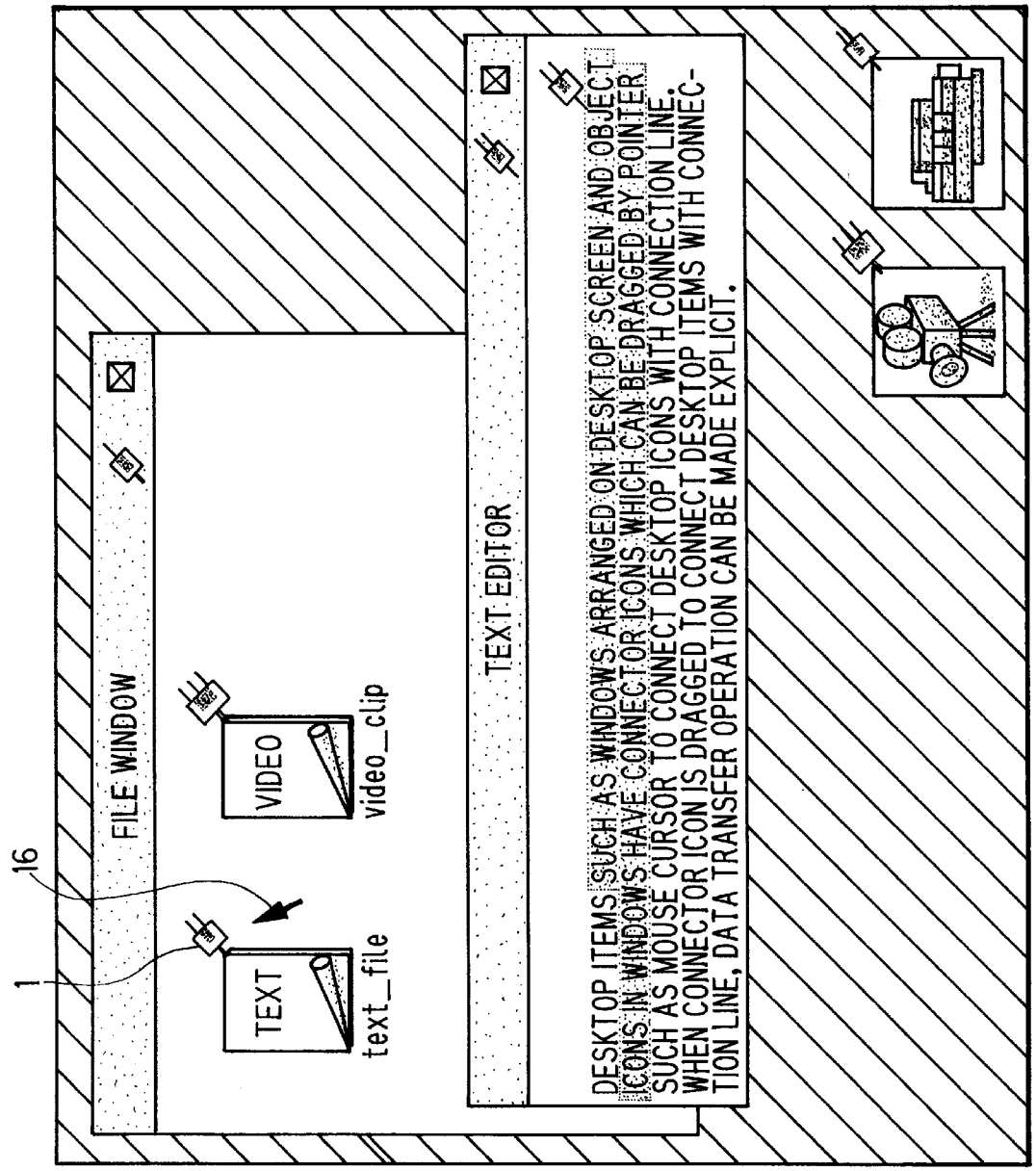
FIG. 1 is a view showing an image display screen for a data transfer displaying/operating method according to the first embodiment of the present invention.

FIG. 1 shows an image display screen for a data transfer displaying/operating method according to the first embodiment of the present invention. This display screen is a desktop screen which simulates a desktop situation using icons and menus. A file window 22, an edit window 23, device icons 24, and pointer icons 16 are displayed on the desktop screen. File icons 25 are displayed in the file window 22, and an edit object 26 is displayed in the edit window 22. Each of the file and device icons has a connector image 1 as a subicon representing an additional function. The respective images displayed on the display screen shown in FIG. 1 will be described below.

Figure 2:
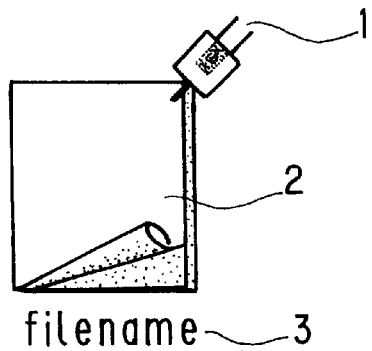
FIG. 2 is a view showing a file icon.

FIG. 2 shows a file icon 25 comprising a connector image 1, a file image 2, and a file name 3. The file icon 25 represents a file, a directory, or a folder on a file system. The file icon is classified and defined in accordance with the contents or type of the file. An icon for text data is called a text file icon. An icon for video clip data is called a video clip file icon.

Figure 3:
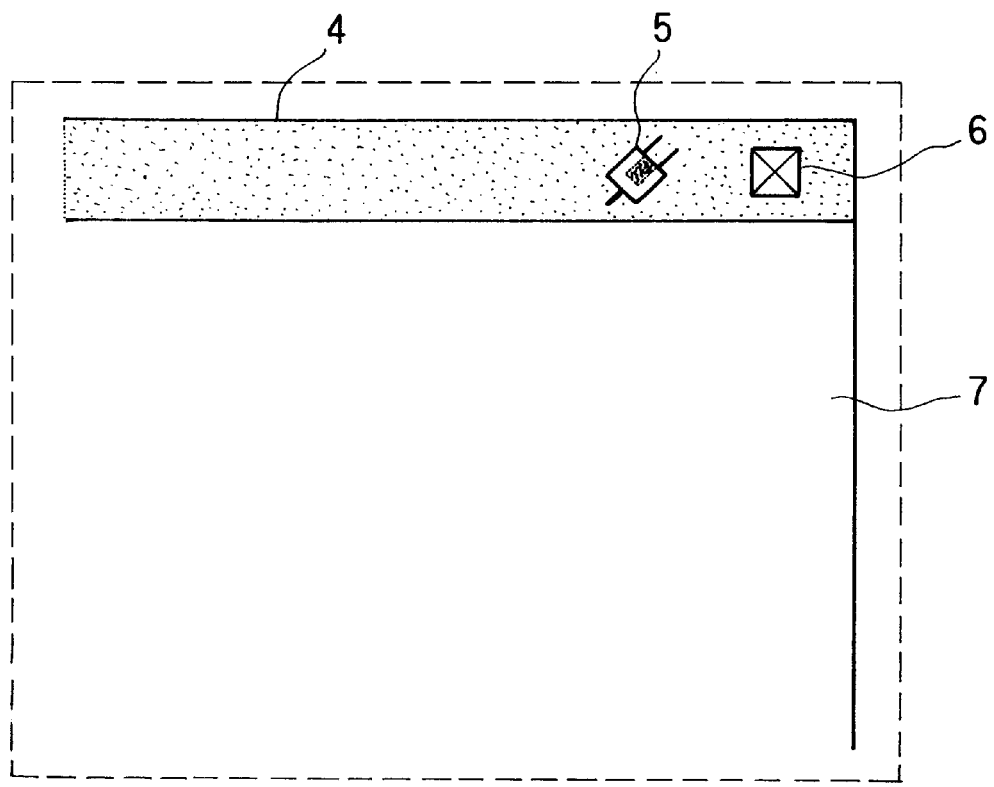
FIG. 3 is a view showing an edit window.

FIG. 3 shows an edit window 23 constituted by a title bar 4, a connector image 5, a "close" button 6, and a window field 7. The edit window 23 is an application program window such as a text editor window or graphic editor window on which data is edited.

Figure 4:
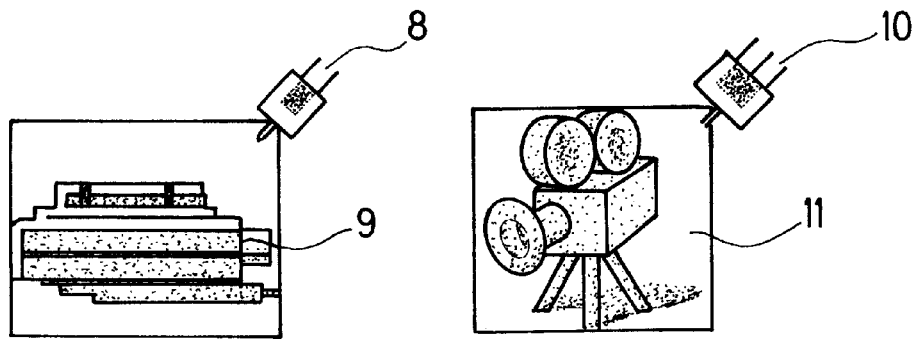
FIG. 4 is a view showing device icons.

FIG. 4 shows device icons 24 having device images 9 and 11 and connector images 8 and 10, respectively. The device icon illustrates a device driver for data communication with external hardware such as a printer, an image scanner, or a video board.

Figure 5:
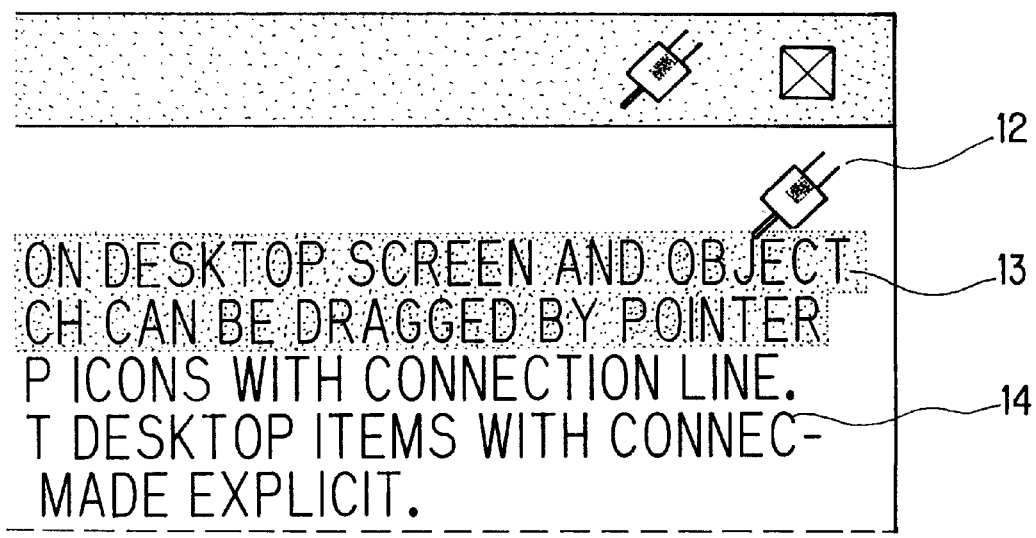
FIG. 5 is a view showing an edit object.

FIG. 5 shows an edit object 26 constituted by a connector image 12 and edit areas 13 and 14. The edit object 26 represents an area designated on an edit application window such as a text editor window or a graphic editor window in order to cut or copy data.

Figure 6:
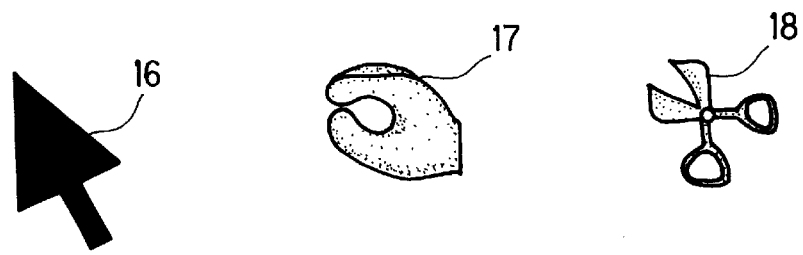
FIG. 6 is a view showing pointer icons.

FIG. 6 shows pointer icons each of which has a shape corresponding to operation contents and indicates a target object. A pointer icon 16 has an arrow shape, a pointer icon 17 has the shape of a hand picking up something, and a pointer icon 18 has the shape of scissors.

Figure 7:
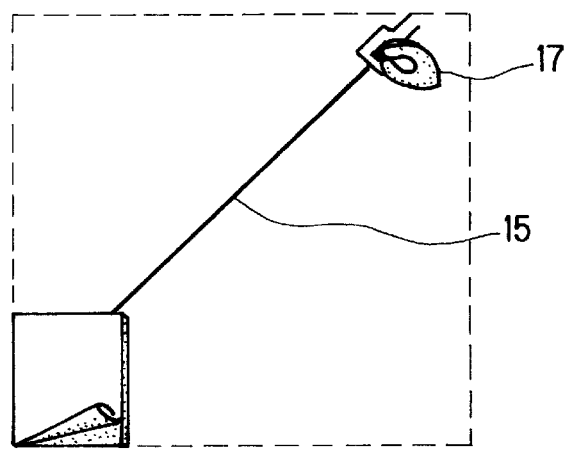
FIG. 7 is a view showing a connector icon which moves together with the pointer icon.

FIG. 7 shows a connector icon 1 (to be referred to as a connector hereinafter) which moves together with a pointer icon (to be referred to as a pointer hereinafter). The pointer 17 has the shape of a hand picking up the connector, and a connection line 15 connecting the file icon 1 and the connector 1 appears.

Figure 8:
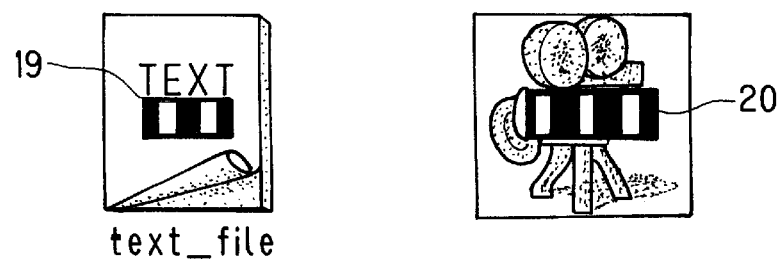
FIG. 8 is a view showing a socket shape.

When the connector of an arbitrary desktop object follows the pointer, socket shapes 19 and 20 for receiving the dragged connector are displayed on other desktop objects, as shown in FIG. 8.

FIG. 9 shows a data type correlation table indicating a correlation among object data types in association with connection enabling/disabling conditions. This table has a matrix structure wherein the abscissa represents outputs and the ordinate represents inputs. For example, a graphic object can be output to a graphic object although it cannot be output to a text object. In this way, transfer enabling/disabling information is set in units of data types. This information is set by the user in advance on the basis of conditions of input/output devices or driver software and stored in a memory. The direction of input/output of a connector is determined such that a connection source is set as an output, and a connection destination, i.e., a socket is set as an input. When object data types obtained by searching for all desktop objects are set on the input side, the intersection of the abscissa and the ordinate is decided. Resultant connection enabling information is represented by "○", and connection disabling information is represented by "x", as shown in FIG. 9.

Figure 10:
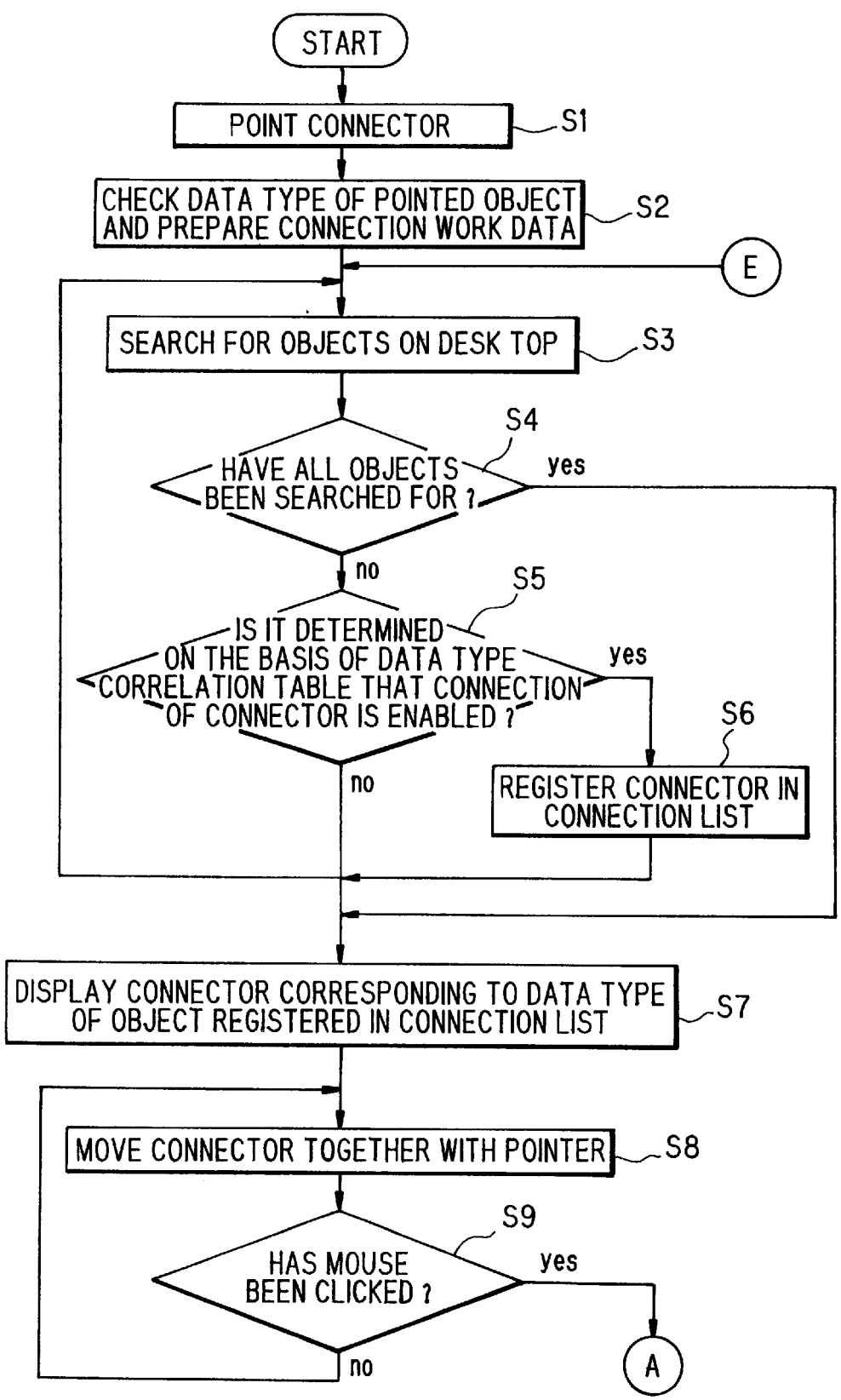
FIG. 10 is a flow chart for explaining the data transfer displaying/operating method of the present invention.
Figure 11:
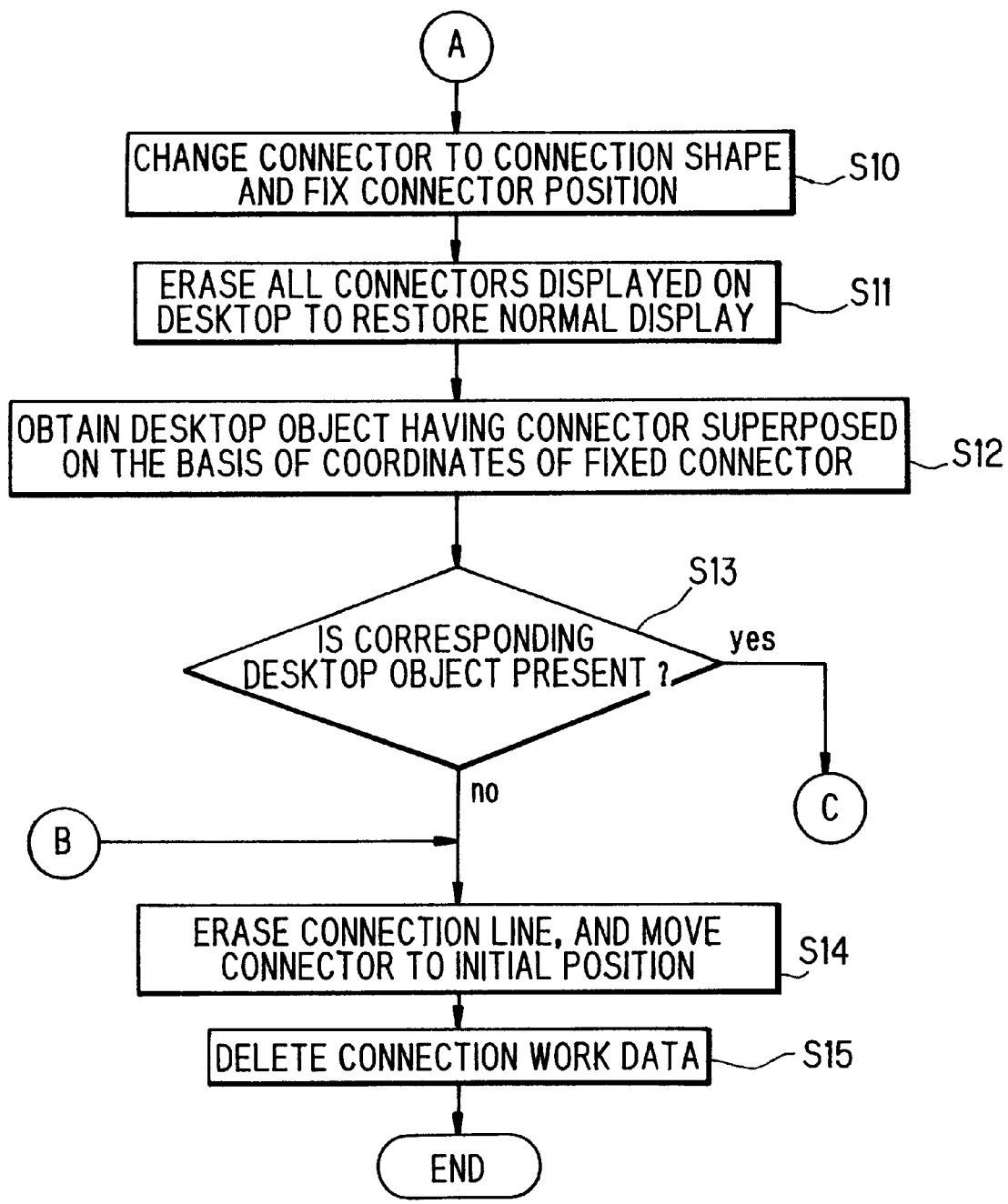
FIG. 11 is a flow chart for explaining the data transfer displaying/operating method of the present invention.
Figure 12:
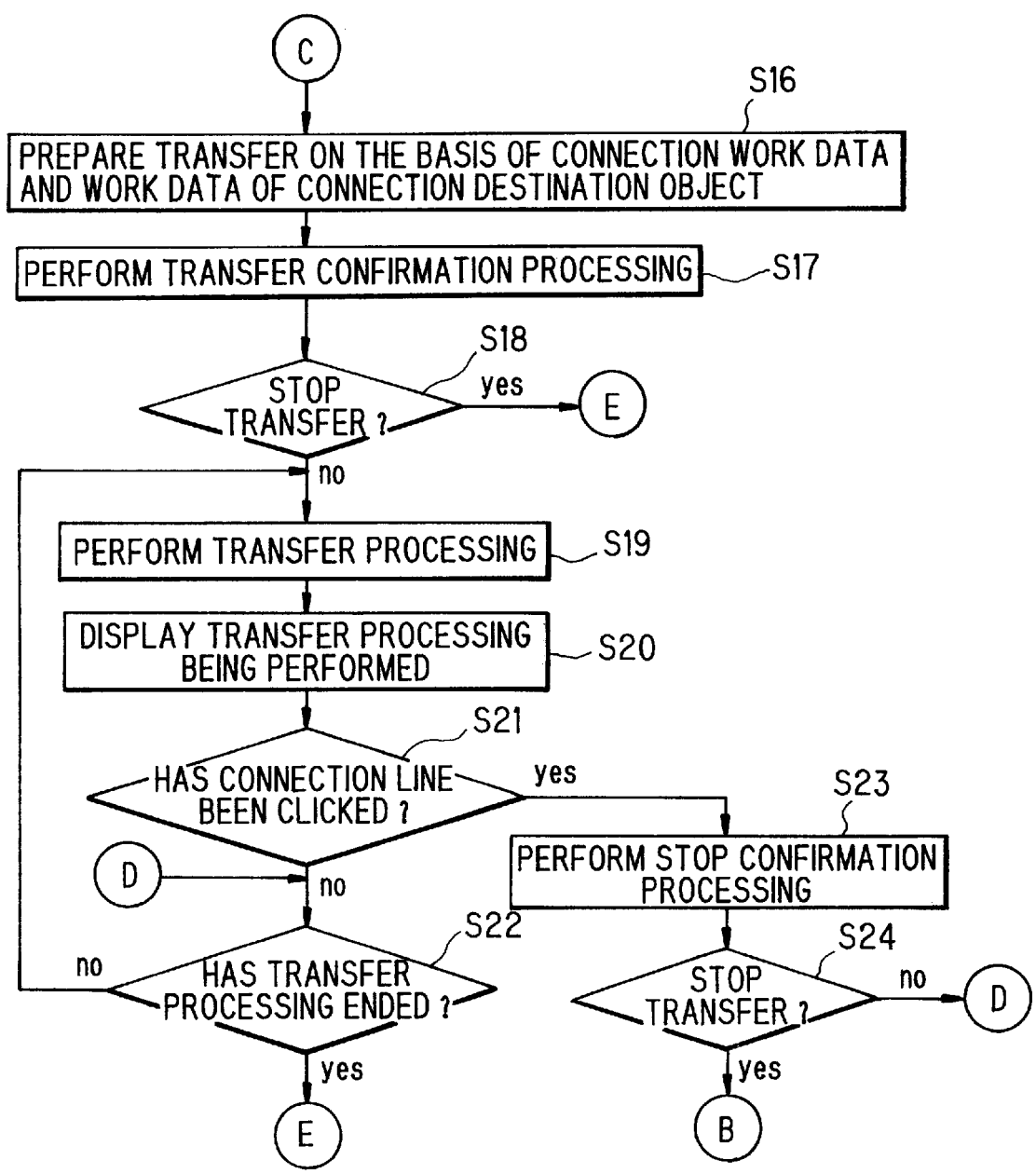
FIG. 12 is a flow chart for explaining the data transfer displaying/operating method of the present invention.

The data transfer displaying/operating method of this embodiment will be described next with reference to the flow charts shown in FIGS. 10 to 12.

Figure 13:
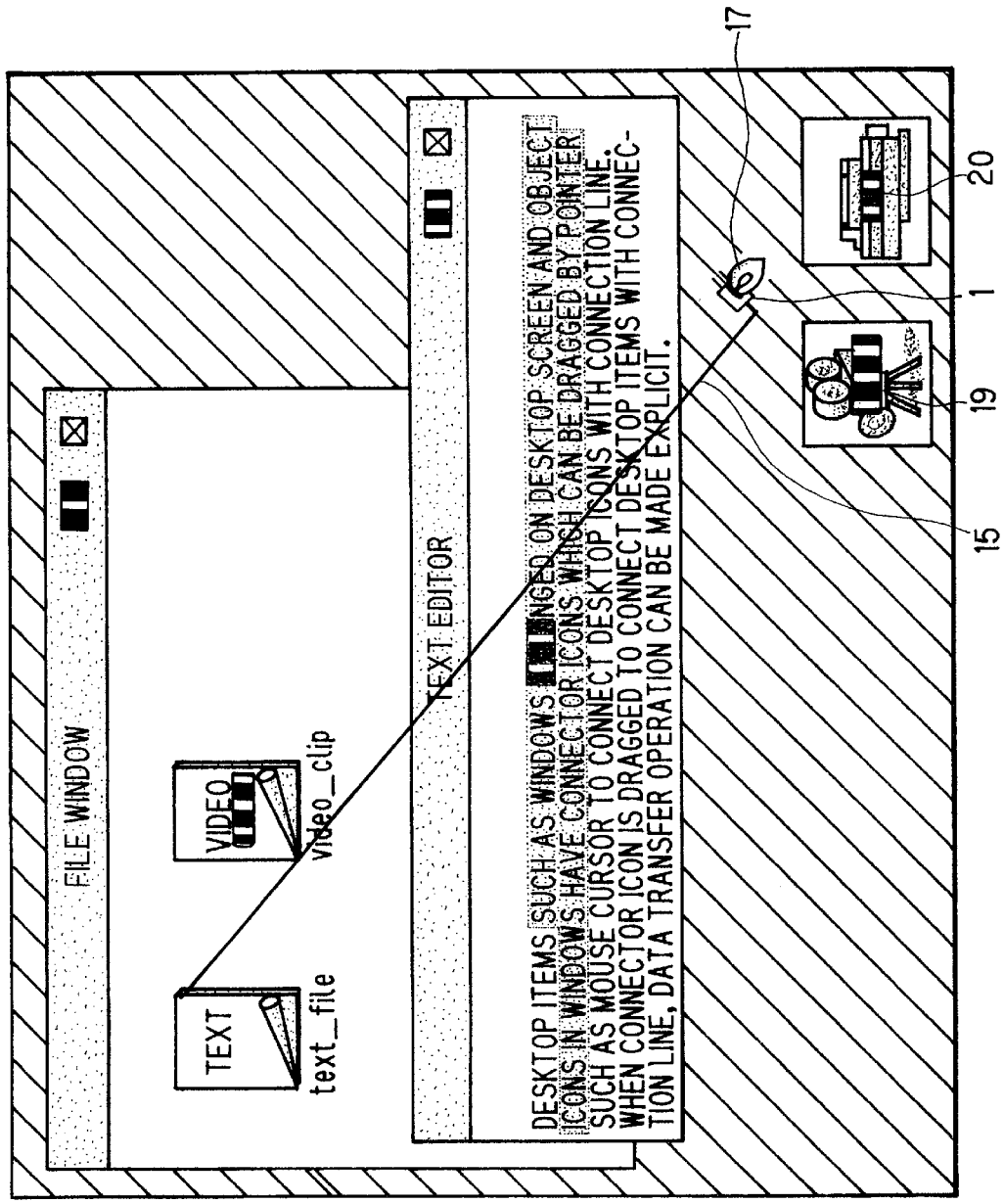
FIG. 13 is a view showing a display screen of phase 1.

In a display screen shown in FIG. 13, the pointer 16 is clicked on the connector 1 added to an object (text file icon) to be transferred, thus starting processing for transfer (S1). The attribute of the connection source object is checked, and connection work data is prepared. At this time, the abscissa and ordinate of the data type correlation table are determined. The connection work data stores the attribute information of the object, process information for managing the object, the attribute of the connector, and information of the function of the connector (S2). All desktop objects arranged on the desktop screen are searched for (S3).

It is determined next whether the desktop objects have been searched for (S4). If YES in step S4, processing from step S7 is performed. The data type of the connection work data is compared with the data types of all searched objects having sockets with reference to the data type correlation table shown in FIG. 9. It is determined whether connection is enabled (S5).

If it is determined that the connection source object can be connected to the socket of the connection destination object, the connector is registered in a connection candidate list (S6). If it is determined that connection is disabled, the connector is not registered in the connection candidate list. Processing in steps S3 to S6 is performed until all the desktop objects are searched for.

As shown in the display screen of FIG. 13, the sockets of objects registered in the connection list are displayed (S7). The connector 1 moves together with the pointer 17 so that the connection source object is coupled to the connector with a connection line (S8). It is determined that the mouse has been clicked (S9). Processing in steps S1 to S9 is called phase 1 of transfer processing.

Figure 14:
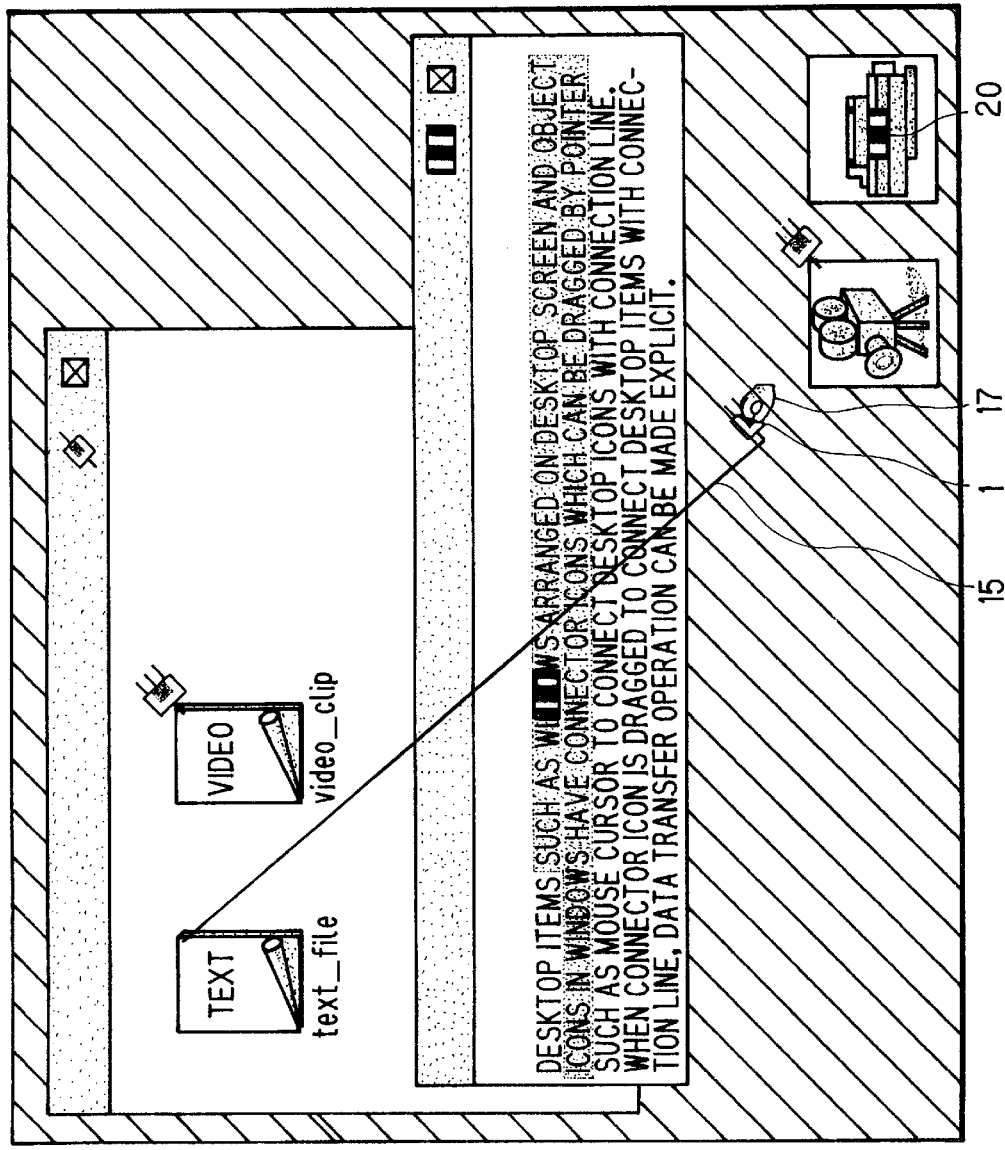
FIG. 14 is a view showing another example of the display screen of phase 1.

When the number of object types increases, the number of connection destination connectors also increases, so the target connection destination connector becomes hard to find. To avoid this disadvantages;, in another display example shown in FIG. 14, only the connector 1 of the connection source object and connectors of connection destination objects for which connection is enabled are displayed. In this fashion of display, even when the number of types of objects on the desktop screen increases, the connector of the target connection destination can be easily selected.

If YES in step S9, the connector 1 takes a shape for connection and is fixed at the pointer position where the mouse has been clicked (S10). Since the connection destination object is decided, all sockets displayed on the desktop screen are erased and returned to normal plugs, excluding the connector of the connection source object (S11). The socket of an object at the position where the connector is fixed is obtained (S12). It is determined whether a socket is present at the connector fixed position (S13). If YES in step S13, preparation for data transfer is continued. In this case, the function of inputting data to the object accompanied with the connected socket is decided. If NO in step S13, the connection line is erased, and the connector is moved to the position of the connection source object (S14). The connector is returned to a normal plug display, the connection work data is deleted, and all transfer processing operations are ended (S15).

When preparation for data transfer is to be continued in step S13, a device driver to be transferred and the presence/absence of confirmation of transfer are determined in accordance with the connection work data and the file conditions of the connection destination object to prepare transfer. When a plug of another desktop object is connected to a plurality of sockets accompanying a given desktop object, a transfer preparation is started depending on the given desktop object (S16). When setting or confirmation for printing of text cata or overwrite of a file is necessary before transfer, a dialogue box is opened to request the user of confirmation (S17). If transfer is to be stopped, processing returns to the operation of phase 1. Otherwise, transfer processing is continued (S18).

Figure 15:
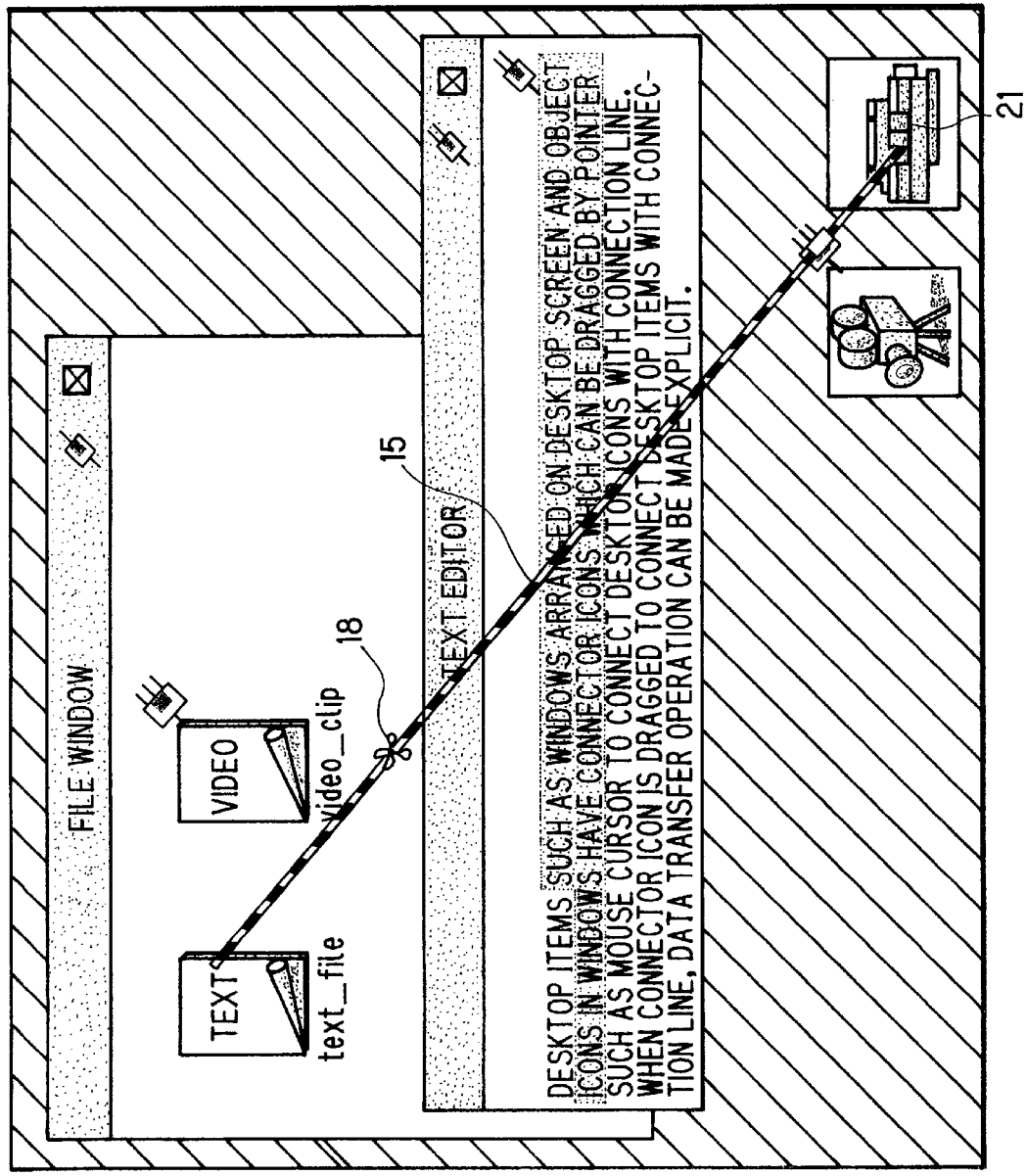
FIG. 15 is a view showing a display screen of phase 2.

When all preparations for transfer have been made, data is transferred (S19). During data transfer processing, the socket of the connection destination object is changed to a connection end shape 21, as shown in FIG. 15, and the pattern of the connection line 15 moves to display the transfer operation. With this arrangement, whether transfer processing is being performed can be visually confirmed (S20). During the transfer processing, the connection line clicking operation for stopping the transfer operation is confirmed (S21). After completion of the transfer operation is confirmed, if data is being transferred, processing from step S19 is repeated (S22). When the transfer operation is ended, the flow returns to the operation of phase 1 to perform the operation of moving the connector together with the pointer. Processing in steps S11 to S22, i.e., processing performed while the connector of the connection source is connected to the connection destination object is called phase 2.

In step S21, when the pointer 18 has moved onto the connection line, the pointer 18 takes the shape of scissors (see FIG. 15). When the connection line is clicked, an operation of cutting the connection line is displayed. A dialogue box for confirming the stop of processing is opened to confirm the stop (S23). When transfer is to be stopped, the transfer operation can be stopped by performing the operation of clicking and cutting the connection line. When the transfer operation is to be stopped, transfer end processing in steps S14 and S15 is executed. Otherwise, the transfer operation is continuously repeated (S24).

Figure 16:
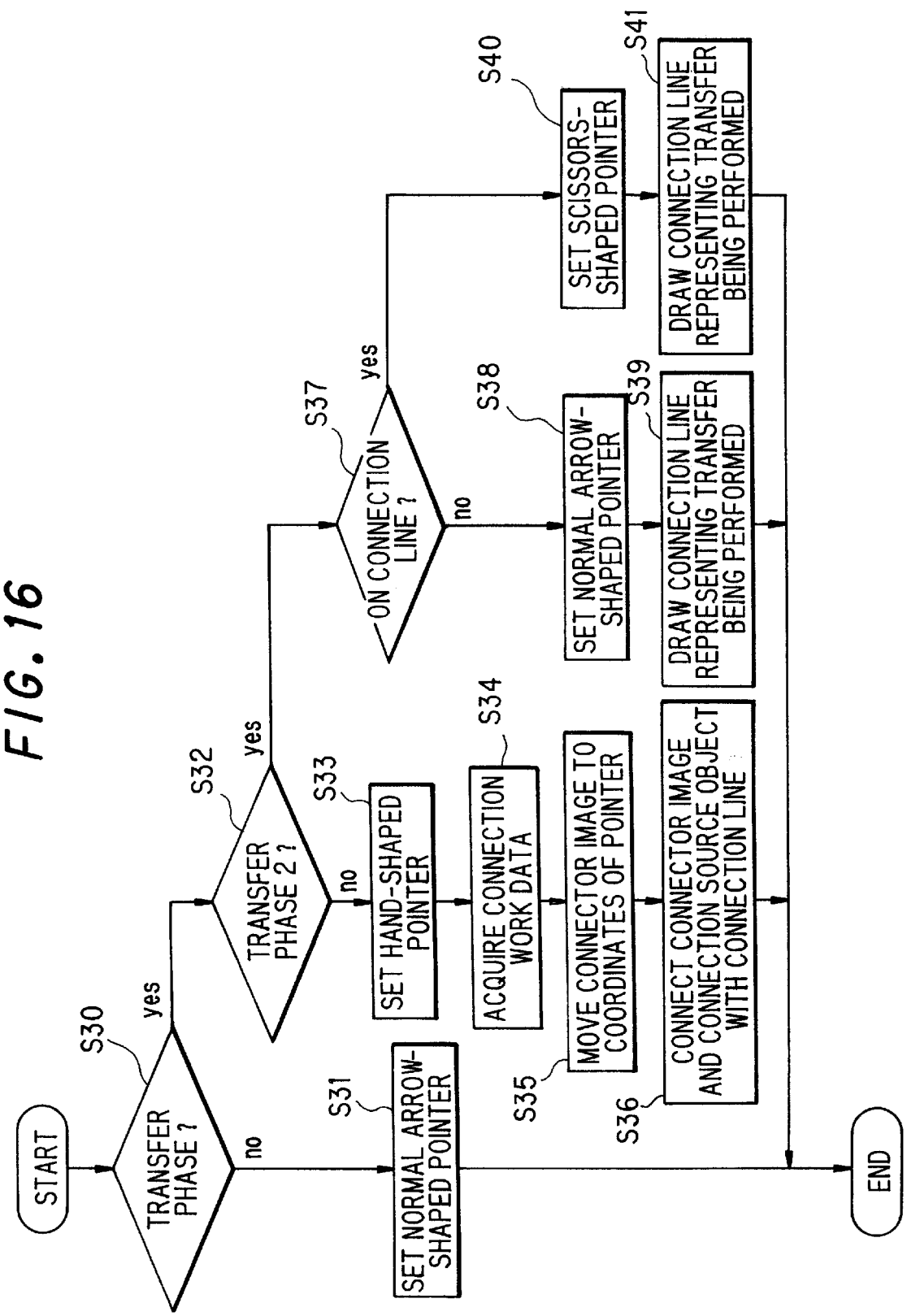
FIG. 16 is a flow chart for explaining change of a pointer icon shape.

A change in pointer icon shape will be described next with reference to the flow chart shown in FIG. 16. The pointer shape is changed depending on whether the data transfer operation is being performed or depending on the phase of data transfer, so that the user can know the current operation mode.

It is confirmed on the basis of a flag in the system whether transfer processing is being performed (S30). If NO in step S30, the pointer icon has an arrow shape (S31). If YES in step S30, it is determined whether the transfer processing is in phase 1 or phase 2 (S32).

If it is determined that processing of phase 1 is being performed, the pointer shape is charged to the shape of a hand picking up a connector because the pointer is accompanied with the connector image (S33). The connection work data of the currently accompanying connector is acquired (S34), and the connector image is moved to the coordinates of the pointer (S35). A connection line for connecting the connection source object and the connector is drawn (S36).

If it is determined that the transfer processing is in phase 2, it is determined whether the pointer is placed on the connection line to cut the connection line and stop data transfer processing (S37). If NO in step S37, the pointer icon has an arrow shape (S38). A connection line with movement representing that data is being transferred is drawn (S39). If YES in step S37, the pointer icon shape is changed to the shape of scissors for stopping the processing (S40). A connection line with movement representing that data is being transferred is drawn (S41).

As described above, data can be easily transferred from the transmission source to the transmission destination only by designating an icon on the screen and a subicon added to the icon using the pointer.

Figure 17:
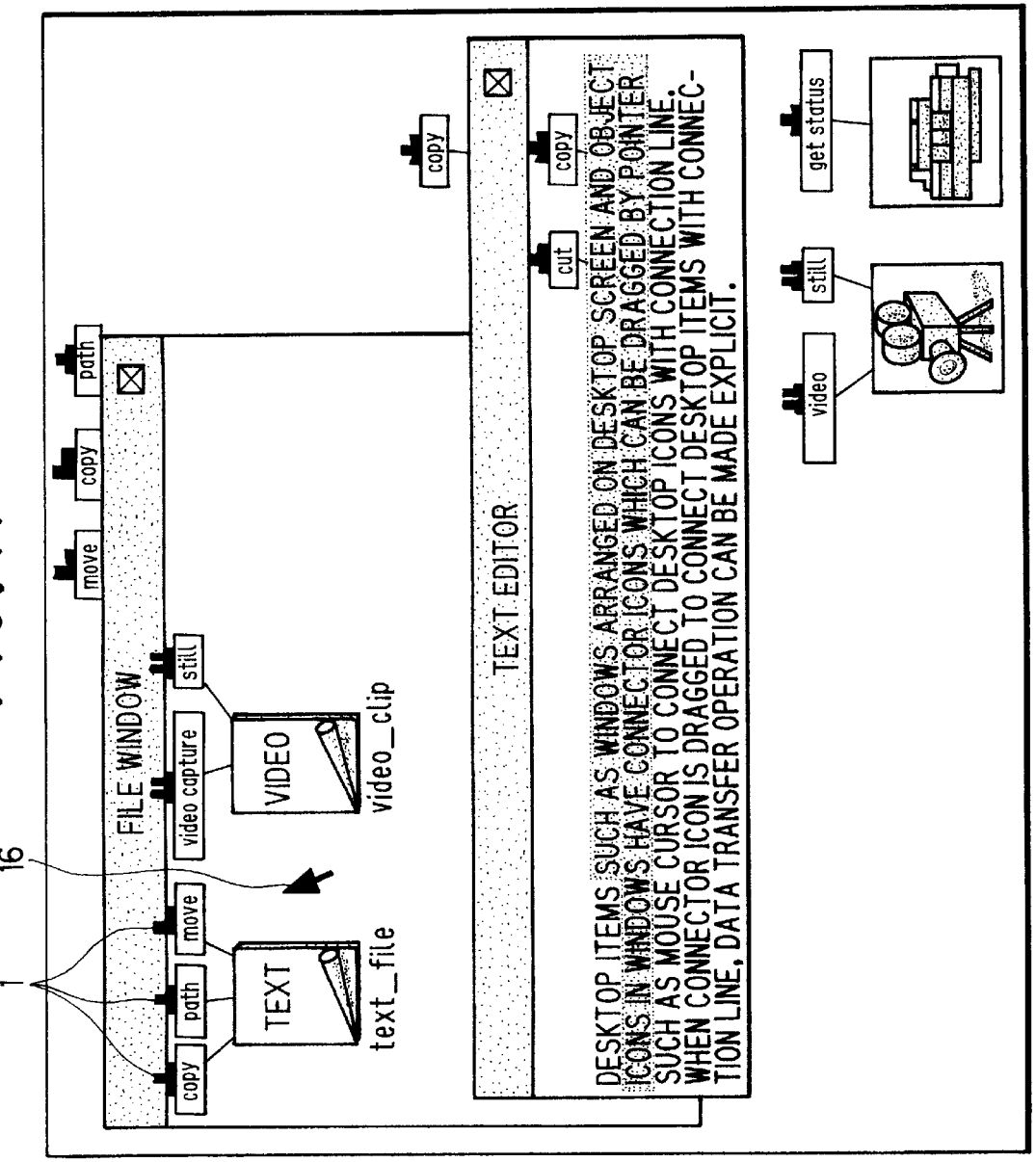
FIG. 17 is a view showing an image display screen for a data transfer displaying/operating method according to the second embodiment of the present invention.

FIG. 17 shows an image display screen 27 for a data transfer displaying/operating method according to the second embodiment of the present invention. In this embodiment, subicons 28 having projecting and recessed shapes are used in place of connector-shaped subicons. A text file 29 is accompanied with subicons 28 for selecting a data output function, i.e., "copy", "path", and "move". When "copy" is selected, the contents of the object are output. When "move" is selected, the object is moved to another directory. When "path" is selected, the path name of the directory to which the file icon belongs is output in the form of text data.

Figure 18:
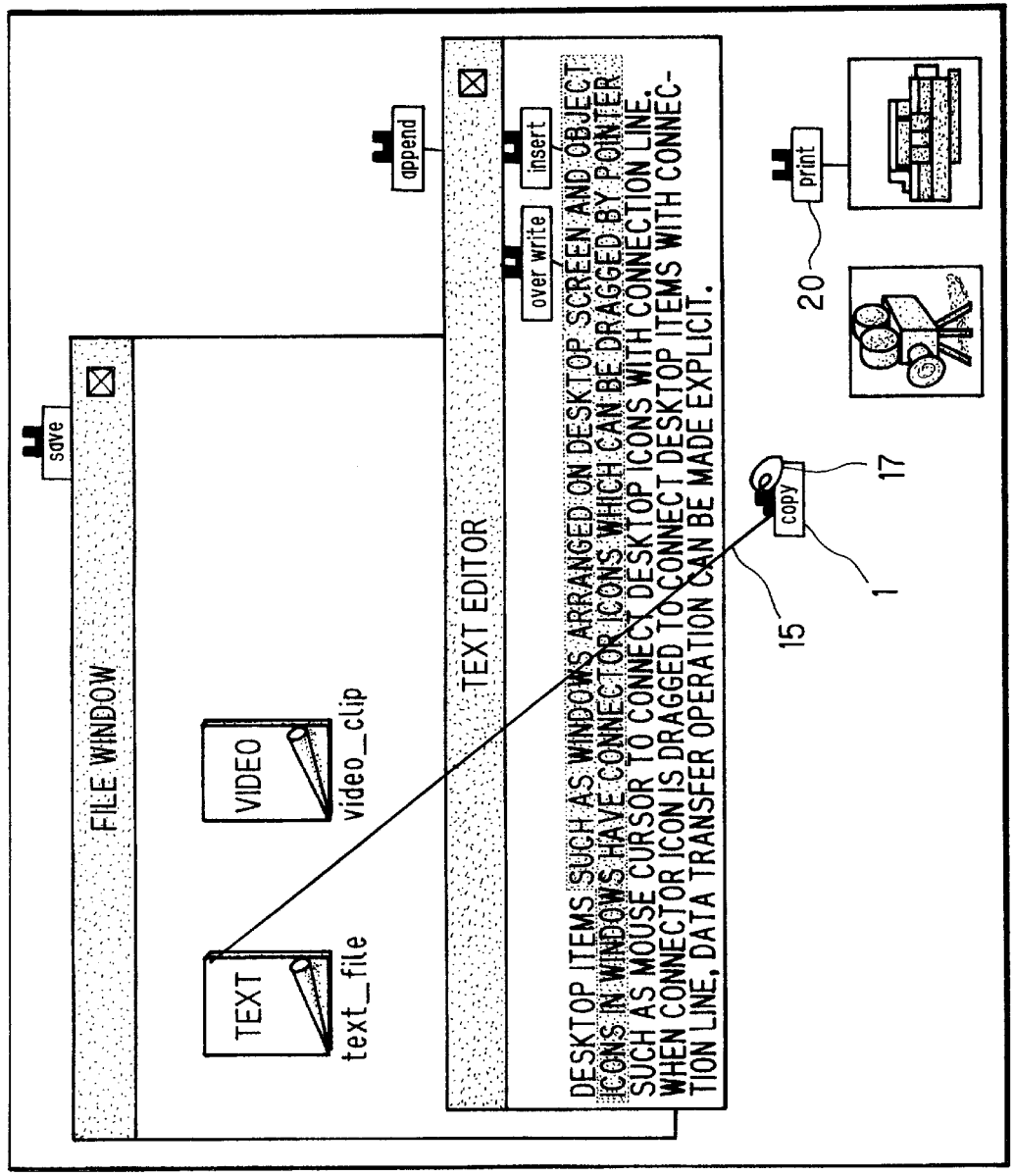
FIG. 18 is a view showing a display screen of phase 1 in the second embodiment.

FIG. 18 shows the screen 30 of phase 1 in this embodiment. When "overwrite" is selected as a text editor window input function 32, input text data is overwritten on text data which is being edited on the text editor window 31. When "append" (33) is selected, input text data is added to the last of the text data which is being edited on the text editor window 31. If no socket is present, transfer end processing is performed. This operation is also used to stop processing of phase 1 without performing transfer processing.

Figure 19:
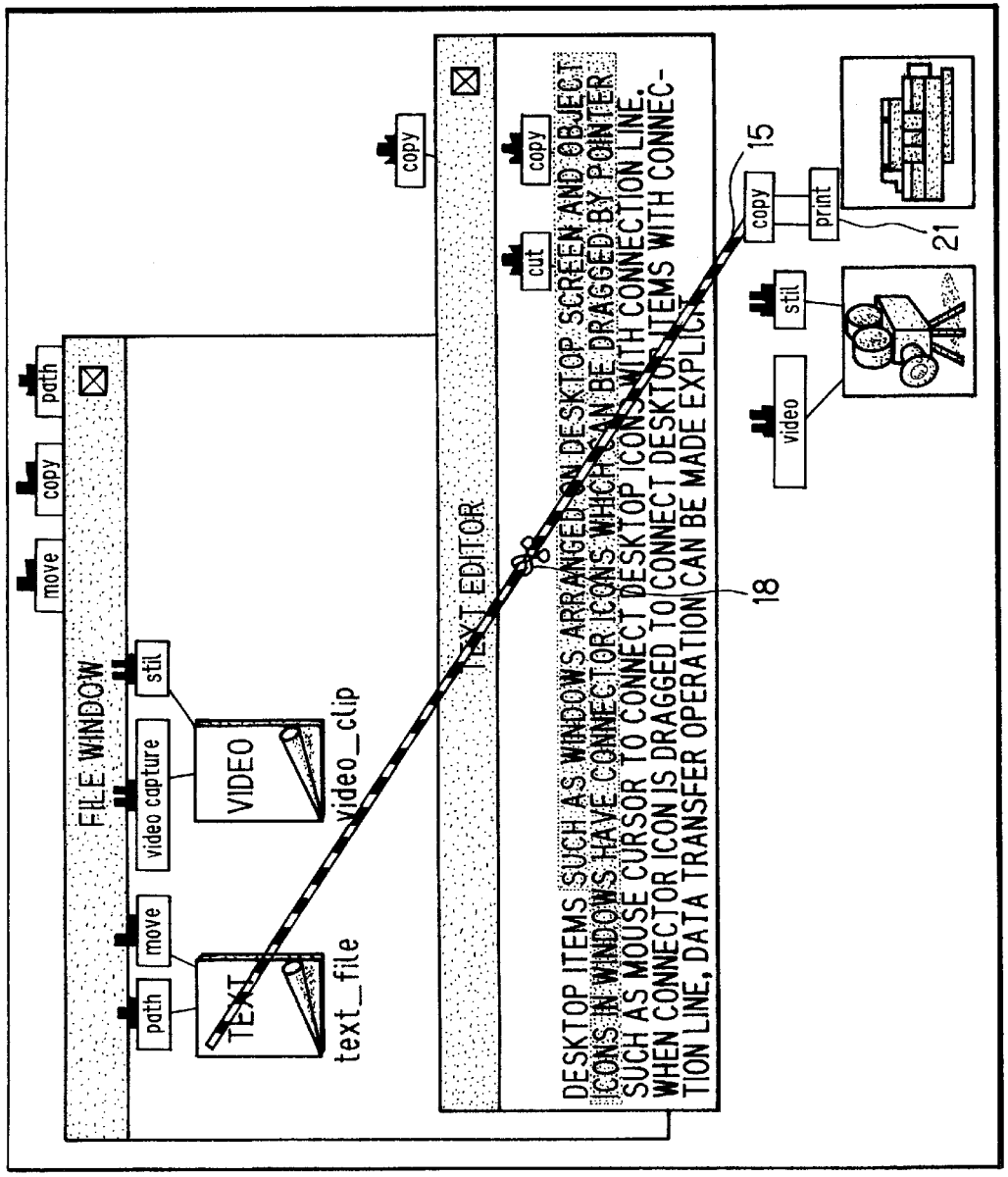
FIG. 19 is a view showing a display screen of phase 2 in the second embodiment.

FIG. 19 shows the screen 33 of phase 2 in this embodiment. In this example, the "copy" function 34 is selected, a printer icon 35 is selected as an output device icon, and text data is being transferred.

In this embodiment, the text editor window 36 or file icon 37 as a transmission source, or the device icon as a transmission destination is accompanied with subicons 38 representing data transfer functions. In a system having this arrangement, a function can be selected without using any pull-down menu.

As has been described above, in the data transfer displaying/operating method according to the first aspect of the present invention, subicons having connector shapes or projecting and recessed shapes are added to icons representing a transmission source and transmission destination of data transfer, and connection is instructed using a pointing icon. With this arrangement, the data transfer operation can be intuitively performed, and even a user inexperienced in the computer operation can easily use the system.

In the data transfer displaying/operating method according to the second aspect of the present invention, the subicons having connector shapes or projecting and recessed shapes move together with the pointing icon. In this system, a data transfer connection instruction can be visually recognized.

In the data transfer displaying/operating method according to the third aspect of the present invention, when connection is to be instructed, the pointing icon changes to the shape of a hand picking up the subicon. Therefore, this system can be intuitively understood by the user.

In the data transfer displaying/operating method according to the fourth aspect of the present invention, connection is instructed by drawing a connection line from the transmission source to the transmission destination. Therefore, this system can be intuitively understood by the user.

In the data transfer displaying/operating method according to the fifth aspect of the present invention, stop of data transfer is instructed by cutting the connection line using a pointing icon having a shape of scissors. Therefore, this system can be intuitively understood by the user.

In the data transfer displaying/operating method according to the sixth aspect of the present invention, whether data transfer is enabled is determined on the basis of a data type correlation table. Therefore, in this system, whether data transfer from the transmission source to the transmission destination is enabled can be easily determined in a short time.

In the data transfer displaying/operating method according to the seventh aspect of the present invention, subicons having plug and socket shapes or projecting and recessed shapes are added to the icons representing the transmission source and transmission destination for which data transfer is enabled. In this system, the combination of the transmission source and the transmission destination for which data transfer is enabled can be visually recognized with ease.

In the data transfer displaying/operating method according to the eighth aspect of the present invention, only icons of the transmission source and transmission destination for which data transfer is enabled have subicons having connector shapes or projecting and recessed shapes. In this system, the combination of the transmission source and the transmission destination for which data transfer is enabled can be easily recognized in a short time.

In the data transfer displaying/operating method according to the ninth aspect of the present invention, subicons representing data transfer functions are displayed together with the icons of the transmission source and transmission destination. In this system, a function can be selected without using any pull-down menu.

What is claimed is:

1. A method for transferring and displaying data in a computer having a graphical user interface, comprising:

displaying a pair of icons representing source and destination objects for data transfer on a screen of a display;

connecting the source and destination icons with a displayed line; and transferring data from the source to the destination objects, wherein data transfer between the source and destination objects is performed upon displaying the connection line, without a pop-up or pull-down menu on the screen of the display.

2. The method according to claim 1, wherein the step of connecting includes manipulating a pointing icon to draw and display the line, said line graphically indicating the transfer of data to a user.

3. The method according to claim 1, wherein each of said source and destination icons have at least one subicon attached thereto on the screen of the display.

4. The method according to claim 3, wherein the subicon is at least one of a connector shape and a projecting and recessed shape.

5. The method according to claim 3, wherein the step of connecting further includes moving the subicon attached to the source icon with a pointing icon.

6. The method according to claim 5, wherein the pointing icon is in the shape of a hand grasping the subicon.

7. The method according to claim 1, further including cutting the line connecting source and destination icons for data transfer with a pointing icon to terminate data transfer.

8. The method according to claim 7, wherein the pointing icon has the shape of scissors.

9. The method according to claim 1, wherein data transfer between the source and destination icons is determined from a data type correlation table stored in a memory of the computer.

10. The method according to claim 9, further including displaying subicons having plug and socket shapes or projecting and recessed shapes with the source and destination icons, when it is determined from the data type correlation table that data transfer is enabled.

11. The method according to claim 9, wherein the source and destination icons have subicons of connector or projecting and recessed shapes attached thereto when it is determined from the data type correlation table that data transfer is enabled.

12. A method for transferring and displaying data in a computer having a graphical user interface, comprising:

displaying a pair of icons representing source and destination objects for data transfer on a screen of a display;

connecting the source and destination icons with a connection line between the source and destination icon, said connection line drawn by moving a pointing icon on the screen;

transferring data from the source to destination; and changing the shape of the pointing icon upon completion of data transfer.

13. The method according to claim 12, further including graphically cutting the connection line with the pointing icon to terminate data transfer.

14. The method according to claim 13, wherein the pointing icon is in the shape of scissors.

15. The method according to claim 12, wherein each of said source and destination icons have at least one subicon attached thereto on the screen of the display.

16. The method according to claim 15, wherein the subicon is at least one of a connector shape and a projecting and recessed shape.

17. The method according to claim 16, wherein the step of connecting further includes moving the subicon attached to the source icon with the pointing icon.

18. The method according to claim 17, wherein the pointing icon is in the shape of a hand grasping the subicon.

19. The method according to claim 12, wherein data transfer between the source and destination icons is determined from a data type correlation table stored in a memory of the computer.

20. The method according to claim 19, further including displaying subicons having plug and socket shapes or projecting and recessed shapes with the source and destination icons, when it is determined from the data type correlation table that data transfer is enabled.

21. The method according to claim 19, wherein the source and destination icons have subicons of connector or projecting and recessed shapes attached thereto when it is determined from the data type correlation table that data transfer is enabled.

* * * * *